UNITED STATES PATENT OFFICE 2,180,165

METHOD FOR PICKLING MEAT

August Nietiedt, Magdeburg, Germany

No Drawing. Application May 23, 1939,
Serial No. 275,213

1 Claim. (Cl. 99—159)

This invention relates to the production of durable provisions such as hams, beef and the like from fresh meat.

The object of the invention is, to convert this fresh meat into durable provisions in a short period of time which was hitherto not possible, and in such a manner that a preserved meat ready for cutting, that is ready for consumption, is produced in a few hours and without loss of weight, whereas by the method hitherto generally used the finished article was only ready for consumption after 14 days or more and with a loss of weight up to 25% depending upon the kind of meat being treated. Furthermore, by the use of the present invention the consumption of pickling material, for example concentrated solution of salt and saltpeter, is considerably reduced and working space is saved owing to the doing away with the many working places and vats hitherto necessary.

The production according to the invention of smoked goods ready to cut consists substantially in that the fresh piece of meat is first permeated as completely as possible with salt solution. Instead of laying the piece of meat in soak in the brine for a long period (several days), this is attained according to the invention by repeated piercing with hollow needles through which the brine is forced by pressure into the interior of the piece of meat, which will thus become swelled and soft so that it is then only necessary to remove the excess liquid.

Instead of the complicated and time wasting external salting or even pressing of the piece of meat for this purpose, whereby its appearance becomes unappetizing, these pieces of meat are packed in narrow meshed fabric and placed in a centrifugal, whose centrifuging effect forces the liquid through the meat in outward direction where it is caught without loss and can be immediately used again.

The meat on being removed from the centrifugal is firm and uniformly permeated with salt brine and ready for smoking and can be placed directly in the smoking chamber. As the meat is rendered firm and dry by the centrifuging and no washing is necessary for removing the salt which otherwise separates out by the usual process, the time required for the smoking process is considerably reduced by the method according to the invention.

I claim:

A method for pickling meat consisting in successively permeating the piece of meat with salt solution with an addition of saltpeter by injection, wrapping the salted piece of meat in a narrow meshed cloth, placing the packet in a centrifugal, centrifuging the packet to expell the excess injected brine from the piece of meat, and catching the expelled brine for use again, and in subjecting the centrifuged piece of meat directly to the smoking process.

AUGUST NIETIEDT.